Patented Sept. 28, 1948

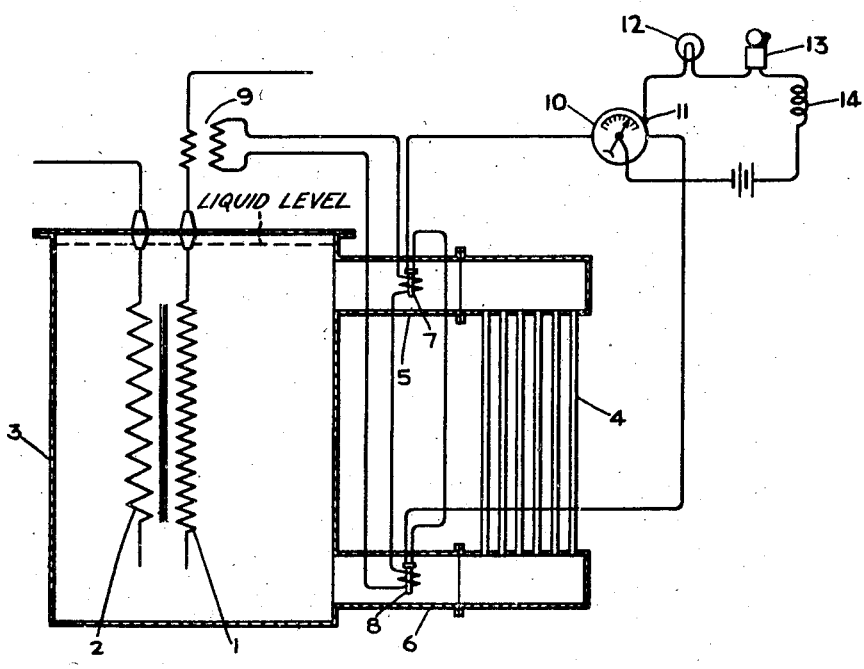

2,450,269

UNITED STATES PATENT OFFICE 2,450,269

TEMPERATURE MEASURING SYSTEM

Armand A. Chabrol, Seine, France, assignor to General Electric Company, a corporation of New York Application September 20, 1946, Serial No. 698,358
In France July 16, 1945

Section 1, Public Law 690, August 8, 1946
Patent expires July 16, 1965

1 Claim. (Cl. 73—350)

This invention relates to temperature measuring system and more particularly to winding temperature indicators and relays for liquid immersed induction apparatus.

It is very important that the user of electric transformers should know, with sufficient accuracy, the temperature of the windings of his apparatus, especially if these are high-capacity, high-voltage transformers. However, it is not easy to acquire that knowledge by using a sounding device or probe or thermocouple which comes in direct contact with the windings.

A solution which has frequently been adopted consists in placing, in the oil of the transformer, a heating element which is embedded in heat insulation whose thermal constant is the same (as much as possible) as that of the winding whose temperature is to be measured or responded to, this heating element being traversed by a current which is proportional to the current flowing through the winding. Within said heating element a sounding device or probe is positioned, and the variation in the resistance of that probe, which is responded to by means of a relay or an instrument graduated in degrees, directly indicates the temperature of the winding.

In this arrangement the oil temperature, which is generally considered, is that of the hottest oil, the temperature-recording device being then placed in the oil at the top of the transformer tank. However, the windings are located in oil whose temperature is variable and rises progressively upward in the tank. Hence, to obtain a response to the mean temperature of the windings, it would be necessary to immerse the temperature-recording device in that part of the oil which is half way up the winding, but such an arrangement would entail an increase in the lateral dimensions of the tank and consequently in the weight of the oil. The present invention is directed to a new device which does away with this shortcoming.

This new arrangement, which is particularly adapted to transformers in oil or other insulating liquid, can also be applied to all other electric apparatus (for instance reactors), both as regards their insulation and their cooling under similar conditions. It is essentially characterized by the fact that the temperature is measured by means of two thermal elements which, instead of being placed within the tank that contains the apparatus whose temperature is to be recorded, are mounted in the immediate vicinity of the pipes, respectively, which leave and enter the tank, and which are connected with means for cooling the oil or similar insulating liquid. Moreover, the two thermal elements are dimensioned and connected with each other and with the temperature indicator, so that the latter will give the mean of the temperatures which would correspond to the two elements, that is to say (considering the positioning of these elements), the mean of the temperature of the hottest parts of the winding and of those parts that are the coolest.

By virtue of this arrangement, the resultant temperature response corresponds closely to the mean temperature of the windings without it being necessary to respond directly to the temperature half way up the windings, and consequently without having to increase the tank dimensions; hence, the location of the elements at the input and output ends of the conduits terminating at the tank does not entail an appreciable increase in the weight of the oil or other insulating liquid.

For thermal elements, one can use standard resistive sounding devices with heating elements or thermocouples or any apparatus which give indications that are an image of the temperature of the parts of the windings which are on a level with said elements. These devices may simply energize an indicator of the mean temperature, or they may also actuate an acoustic or optic device or even bring about the operation of circuit breakers or similar protective or regulating apparatus whenever the mean temperature attains or exceeds the preset limit.

The object of the invention is to provide a new and improved temperature measuring system.

Another object of the invention is to provide a new and improved winding temperature indicating and relay system for liquid filled transformers.

The invention will be better understood from the following description taken in connection with the accompanying drawing and its scope will be pointed out in the appended claims.

Referring now to the single figure of the accompanying drawing, this illustrates diagrammatically an example of the invention. In this example, we have assumed a transformer whose windings are represented schematically at 1 and 2 in the oil tank 3. The cooling of the oil is made possible by lateral radiators, only one of which has been shown at 4. The oil circulates naturally through thermo-siphon effect, 5 being the output pipe for the heated oil, and 6 being the return pipe for the cooled oil. However, forced circulation may obviously be used.

In conformity with the invention, the mean temperature of the transformer windings is recorded by means of two elements 7 and 8 (of a known type), each one of which comprises a heating coil and a sounding device or probe which are positioned (respectively) one, 7, at the entrance of pipe 5 connecting the top of tank 3 to radiator 4, while the other, 8, is positioned at the outgoing end of pipe 6 which connects said radiator to the bottom of tank 3.

The two heating coils, which are assumed to be connected in series, are energized by means of a current transformer 9 whose primary winding is inserted in the circuit of the high voltage winding 1.

The element 7 is so dimensioned that it will produce the image at a reduced scale, i. e., one-half scale, of the temperature of those parts of the winding which are located on top of the tank; the element 8, on the other hand, is so dimensioned that it will give the image, also at a reduced scale, one-half, of the temperature at those parts of the windings at the bottom of the tank. The probing devices of the apparatus 7 and 8 are connected in series to the temperature indicator 10 which thus gives directly and simply the mean temperature of the winding.

It will be seen that the positioning of elements 7 and 8 requires no increase in the size of the tank 3 and will entail no appreciable increase in the volume of the oil, while the positioning of a thermal element within the tank halfway up the windings would have required an increase in the horizontal dimensions of the tank and thus entailed an appreciable increase in the weight of the oil.

The indicator 10 is shown as being provided with a normally stationary contact 11 which may be engaged by the pointer of the indicator when the temperature attains a predetermined value. Upon this occurrence, a circuit will be completed through suitable alarms such as a lamp 12 and a bell 13, and a winding 14 which may be the trip coil of a circuit breaker for the transformer or which may be the operating winding of an auxiliary relay.

While there has been shown and described a particular embodiment of the invention, it will be obvious to those skilled in the art that changes and modifications can be made and, therefore, it is aimed in the appended claims to cover all such changes and modifications as fall within the true spirit and scope of the invention.

What I claim as new and desire to secure by Letters Patent of the United States is:

In combination, a transformer tank, a transformer winding in said tank, a liquid in said tank surrounding said winding, a radiator, top and bottom passageways for said liquid between said tank and radiator, thermoelectric elements located respectively in said passageways, means for heating said elements in proportion to current carried by said winding, an electroresponsive device, and means for connecting said electroresponsive device in series with both of said thermoelectric elements.

ARMAND A. CHABROL.

REFERENCES CITED

The following references are of record in the file of this patent:

UNITED STATES PATENTS

| Number | Name | Date |
| --- | --- | --- |
| 1,494,586 | Cary | May 20, 1924 |
| 1,705,715 | Clark | Mar. 19, 1929 |
| 1,879,276 | Isaac | Sept. 27, 1932 |
| 1,895,947 | Unger | Jan. 31, 1933 |